US012748820B2

(12) United States Patent
Han et al.

(10) Patent No.: US 12,748,820 B2
(45) Date of Patent: Sep. 29, 2026

(54) CLASSIFICATION DEVICE AND CLASSIFICATION METHOD

(71) Applicant: LG ELECTRONICS INC., Seoul (KR)

(72) Inventors: Seunghee Han, Seoul (KR); Hakjoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 787 days.

(21) Appl. No.: 18/086,986

(22) Filed: Dec. 22, 2022

(65) Prior Publication Data

US 2024/0045930 A1 Feb. 8, 2024

(30) Foreign Application Priority Data

Aug. 5, 2022 (KR) ........................ 10-2022-0097917

(51) Int. Cl.

| | |
|---|---|
| ***G06F 18/243*** | (2023.01) |
| ***G06F 18/241*** | (2023.01) |
| ***G06F 18/2431*** | (2023.01) |
| ***G06N 20/00*** | (2019.01) |

(52) U.S. Cl.

CPC ........ *G06F 18/241* (2023.01); *G06F 18/2431* (2023.01); *G06F 18/24317* (2023.01); *G06N 20/00* (2019.01)

(58) Field of Classification Search

CPC ............. G06F 18/241; G06F 18/24317; G06F 18/2431; G06N 20/00

See application file for complete search history.

(56) References Cited

U.S. PATENT DOCUMENTS

| | | | | |
|---|---|---|---|---|
| 7,020,337 | B2 * | 3/2006 | Viola | G06V 40/161 382/118 |
| 7,809,723 | B2 * | 10/2010 | Liu | G06N 20/10 707/736 |
| 7,970,766 | B1 * | 6/2011 | Shamsi | G06N 20/00 707/803 |
| 11,010,692 | B1 * | 5/2021 | Mazor | G06N 3/045 |
| 2017/0083825 | A1 * | 3/2017 | Battersby | G06N 20/00 |
| 2020/0019883 | A1 * | 1/2020 | McCourt, Jr. | G06N 7/00 |
| 2020/0160196 | A1 * | 5/2020 | Ramakrishnan | G06F 18/2178 |
| 2020/0401844 | A1 * | 12/2020 | Han | G06F 18/211 |
| 2021/0279562 | A1 * | 9/2021 | Cmielowski | G06N 3/04 |
| 2023/0177441 | A1 * | 6/2023 | Durvasula | G06N 3/08 706/45 |

* cited by examiner

*Primary Examiner* — Pinkal R Chokshi

(74) *Attorney, Agent, or Firm* — Birch, Stewart, Kolasch & Birch, LLP

(57) ABSTRACT

A method for performing classification can include inputting data to at least one binary classifier configured to perform binary classification to generate a binary classification result; and in response to the binary classification result output by the at least one binary classifier satisfying a preset condition, inputting the data to a multi-classifier configured to perform multi-classification for generating a multi-classification result and outputting a classification result based on the multi-classification result output generated by the multi-classifier.

14 Claims, 7 Drawing Sheets

FIG. 7

```
  )
  (1): BasicBlock(
  (conv1): Conv2d(512, 512, kernel_size=(3, 3), stride=(1, 1), padding=(1, 1), bias=False)
  (bn1): BatchNorm2d(512, eps=1e-05, momentum=0.1, affine=True, track_running_stats=True)
  (relu): ReLU(inplace=True)
  (conv2): Conv2d(512, 512, kernel_size=(3, 3), stride=(1, 1), padding=(1, 1), bias=False)
  (bn2): BatchNorm2d(512, eps=1e-05, momentum=0.1, affine=True, track_running_stats=True)
  )
  (2): BasicBlock(
  (conv1): Conv2d(512, 512, kernel_size=(3, 3), stride=(1, 1), padding=(1, 1), bias=False)
  (bn1): BatchNorm2d(512, eps=1e-05, momentum=0.1, affine=True, track_running_stats=True)
  (relu): ReLU(inplace=True)
  (conv2): Conv2d(512, 512, kernel_size=(3, 3), stride=(1, 1), padding=(1, 1), bias=False)
  (bn2): BatchNorm2d(512, eps=1e-05, momentum=0.1, affine=True, track_running_stats=True)
  )
 )
 (avgpool): AdaptiveAvgPool2d(output_size=(1, 1))
 (fc): Linear(in_featurees=512, out_features=2, bias=True)
)
```

700a

710

⋮

```
  )
  (1): BasicBlock(
  (conv1): Conv2d(512, 512, kernel_size=(3, 3), stride=(1, 1), padding=(1, 1), bias=False)
  (bn1): BatchNorm2d(512, eps=1e-05, momentum=0.1, affine=True, track_running_stats=True)
              ⋮
 (avgpool): AdaptiveAvgPool2d(output_size=(1, 1))
 (fc): Linear(in_featurees=512, out_features=2, bias=True)
)
```

700n

710

MULTI-CLASSIFIER CODE

720

CLASSIFICATION DEVICE AND CLASSIFICATION METHOD

CROSS-REFERENCE TO RELATED APPLICATION

Pursuant to 35 U.S.C. § 119(a), this application claims the benefit of the earlier filing date and the right of priority to Korean Patent Application No. 10-2022-0097917, filed in the Republic of Korea on Aug. 5, 2022, the entirety of which is incorporated by reference into the present application.

BACKGROUND

Technical Field

The present disclosure relates to a classification device and a classification method using binary classification and multi-classification.

Discussion of Related Art

Classification techniques using Machine Learning (ML)/Deep Learning (DL) are being used in various fields.

For example, such techniques may be used for blood cell classification in the medical world, image recognition, and determining whether or not a request is abnormal in a security system. These techniques can also be applied to any system that recognizes and distinguishes objects.

Since those classification techniques are being widely used in many places to which the ML/DL technology is applied, research on different types of classification techniques has been continuously conducted.

Nevertheless, a commonly used type of multi-classification had a limitation in optimization for each situation, which consequently led to limitations in performance improvements.

Classification techniques can include binary classification and multi-classification.

Binary classification can refer to classifying a class as true/false, yes/no or zero/one, and the multi-classification can refer to a technique of selecting one of several different answers or from among many different classes.

Multi-classification is evolving to improve overall accuracy by creating a deep neural network when the number of classes to be classified is generally two or more (i.e., non-binary).

In other words, multi-classification is evolving to increase a depth of a neural network, and concentrating on increasing the overall accuracy of all classes to be classified by collecting as much learning data as possible (e.g., using very large data sets).

Residual Network (ResNet) or Visual Geometry Group neural network (VggNet) are examples that use multi-classification.

There are some limitations in changing multi-classification to binary classification.

First, since a confidence scale is different for each binary classifier (model), there is a possibility of performance degradation if the confidence of each binary classifier is simply compared.

Second, even if each class is balanced, class imbalance occurs when training with the binary classifier.

Third, results obtained through binary classification may not be decisive. Alternatively, a general One vs Rest (OvR) method is based on probability, and if the probability is low for all classes, accuracy is inevitably reduced.

For example, when four classes have probabilities of 0.1, 0.11, 0.1 and 0.1, then the probability of 0.11 is selected because it is the highest value among the four probabilities even though it is still rather low, which causes the accuracy to be lowered.

As for the multi-classification, a hyper parameter or weight value can be decided for a model to enhance overall performance by training a multiple classifier (multi-classifier) using numerous amounts of data.

However, in this type of classification, it is difficult to reflect the characteristics of an application to which the model is applied. Even in the context of multi-classification, there may be a situation in which precision/recall for a specific class is emphasized, but the existing multi-classifier has difficulty in considering and reflecting such characteristics and performance evaluation is carried out only using accuracy, thereby causing limitations for improving optimized performance.

SUMMARY OF THE DISCLOSURE

The present disclosure is directed to solving the aforementioned problems and other drawbacks.

The present disclosure also describes a classification device and a classification method capable of performing classification in an optimized manner by combining both binary classification and multi-classification.

To achieve these aspects and other advantages according to one embodiment of the present disclosure, there is provided a classification method that can include outputting a result for an input classification problem using at least one binary classifier that uses a binary classification, and outputting a result of the input classification problem using a multi-classifier based on the fact that the result output from the at least one binary classifier satisfies a preset condition.

In an embodiment, a number of the at least one binary classifier can correspond to a number of classes to be classified.

In an embodiment, when the number of classes to be classified is n (where n is a natural number), the number of the at least one binary classifier can be n and a number of the multi-classifier can be at least one.

In an embodiment, deciding whether to execute the outputting of the result for the input classification problem using the multi-classifier can be determined based on the result that is output from the at least one binary classifier. For example, an embodiment can include first attempting classification using many individual binary classifiers, and when the output from each of the many individual binary classifiers is unsatisfactory or satisfies a preset condition, then the multi-classifier can be used for classification.

In an embodiment, the outputting the result for the input classification problem using the multi-classifier may not be executed when the result output from the at least one binary classifier does not satisfy the preset condition. For example, when the output from at least one of the many individual binary classifiers is satisfactory or does not satisfy a preset condition, then the use of the multi-classifier can skipped.

In an embodiment, the preset condition can include a situation in which two or more results output from the at least one binary classifier are True, or a situation in which all results output from the at least one binary classifier are False.

In an embodiment, the at least one binary classifier can be plural, and the plurality of binary classifiers can perform classification on different classes.

In an embodiment, the outputting the result for the input classification problem using the at least one binary classifier that uses the binary classification can be configured such that the number of the plural binary classifiers performing the classification problem varies depending on an execution order of the plural binary classifiers.

In an embodiment, in the step of outputting the result for the input classification problem using the at least one binary classifier that uses the binary classification, a first number of binary classifiers can be executed when the plurality of binary classifiers are executed in a first order, and a second number of binary classifiers that is different from the first number can be executed when the plurality of binary classifiers are executed in a second order that is different from the first order.

In an embodiment, the classification method can further include, before the outputting of the result for the input classification problem using the at least one binary classifier that uses the binary classification, receiving data, preprocessing the received data to generate preprocessed data, and replicating the preprocessed data.

In an embodiment, the classification method can further include classifying data for each class to solve the classification problem by using the replicated data, and performing machine learning for the binary classifier for each class using the classified data.

In an embodiment, the classification method can further include performing machine learning of the multi-classifier using the replicated data.

Effects of the Invention

Hereinafter, effects of a classification device and a classification method according to the present disclosure will be described.

According to the present disclosure, when comparing the performance of an ensemble of a single multi-classification model and binary classification models with blood cell classification data, which is representative data of the multi-classification, it can be confirmed that the classification method disclosed herein has achieved performance improvement even when using the same data and same type of models. For example, the classification method according to an embodiment can use binary classifiers in conjugation with at least one multi-classifier, in which they can combine their strengths to shore up each other's weaknesses for improving performance. Also, the binary classifiers can be reordered and retrained for improving optimization.

In addition, in the situation of an issue candidate group extraction model provided by Intellytics, it can be confirmed that the performance is improved from 61% to 97% based on the recall when the classification method proposed in the present disclosure is used.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 7 is a view illustrating confirmation of an advantage of using a classification method according to an embodiment of the present disclosure.

DETAILED DESCRIPTION OF THE EMBODIMENTS

Figure 1:
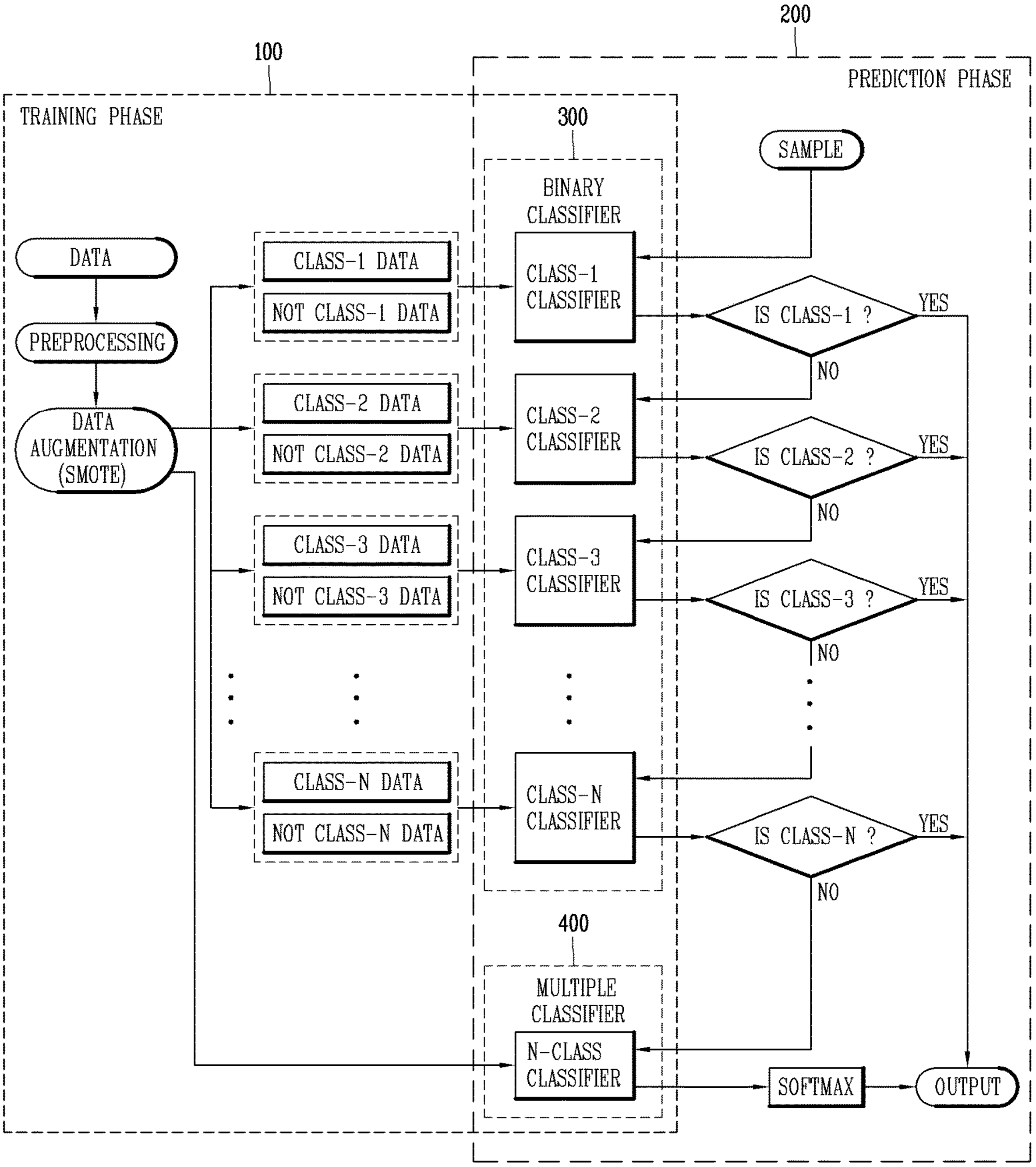
FIG. 1 is a view illustrating a representative classification method in accordance with an embodiment of the present disclosure.

Description will now be given in detail according to example embodiments disclosed herein, with reference to the accompanying drawings. For the sake of brief description with reference to the drawings, the same or equivalent components can be provided with the same or similar reference numbers, and description thereof will not be repeated. In general, a suffix such as “module” and “unit” can be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. can be used herein to describe various elements, these elements should not be limited by these terms. These terms are generally only used to distinguish one element from another.

It will be understood that when an element is referred to as being “connected with” another element, the element can be connected with the another element or intervening elements can also be present. In contrast, when an element is referred to as being “directly connected with” another element, there are no intervening elements present.

A singular representation can include a plural representation unless it represents a definitely different meaning from the context.

Terms such as “include” or “has” are used herein and should be understood that they are intended to indicate an existence of several components, functions or steps, disclosed in the specification, and it is also understood that greater or fewer components, functions, or steps can likewise be utilized.

A classification method (or classification technique) described herein can be implemented by a classification device.

For example, the classification device can correspond to a computer, a server, a desktop PC, a laptop computer (Note Book), a smart phone, a tablet PC, a cellular phone, a smart television (TV), a Personal Communication Service (PCS) phone, a mobile terminal of synchronous/asynchronous IMT-2000 (International Mobile Telecommunication-2000), a Palm Personal Computer (PC), a Personal Digital Assistant (PDA), and the like.

In addition, the classification device or computer can perform communication with a server that performs information processing by receiving a request from a client.

Also, the classification device according to one embodiment can be a mobile terminal.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultrabooks, wearable devices (for example, smart watches, smart glasses, head mounted displays (HMDs)), and the like.

Hereinafter, for the sake of explanation, a classification device and a computer will be used interchangeably. In addition, the classification method can be understood as being performed by the classification device, the computer, or the server as a subject.

Hereinafter, a classification method according to one embodiment of the present disclosure will be described in more detail, with reference to the accompanying drawings.

FIG. 1 is a view illustrating an overall representative classification method in accordance with an embodiment the present disclosure, and FIGS. 2, 3, 4, and 5 are conceptual views for explaining the classification method described in FIG. 1 in a divided according to different parts of the classification method.

Referring to FIG. 1, a classification method according to an embodiment of the present disclosure can be carried out by a combination of a binary classifier 300 that uses a binary classification and a multiple classifier (or multi-classifier) 400 that uses a multi-classification.

A classification device for performing the classification method can include at least one binary classifier 300, a multi-classifier 400, and a processor for controlling the same. For example, the at least one binary classifier 300, and the multi-classifier 400 can be included in the processor.

The processor typically controls an overall operation of the classification device, in addition to operations associated with application programs. The processor can provide or process appropriate information or functions to a user by processing signals, data, information and the like, which are input or output, or activating application programs stored in the memory. The application program can include a binary classifier and a multi-classifier.

The present disclosure can include a training phase 100 for training (learning) a classifier performing classification (e.g., 300 and/or 400), and a prediction phase 200 for performing classification using the trained classifier.

A classification method according to one embodiment of the present disclosure can include, in order to solve a classification problem, outputting a result for an input classification problem using at least one binary classifier that uses binary classification, and outputting a result for the input classification problem using a multi-classifier based on whether or not a result output from the at least one binary classifier satisfies a preset condition.

Here, the binary classifier and the multi-classifier can be independent hardware components or can be software-generated components.

The number of binary classifiers 300 can be one or more.

That is, at least one binary classifier 300 can be provided (or configured), and the number of binary classifiers can correspond to the number of classes to be classified.

Specifically, when the number of classes to be solved is n (where n is a natural number), n binary classifiers 300 can be provided, and at least one multi-classifier 400 can be provided. Also, a plurality of multi-classifiers 400 can be used according to another embodiment.

When only one multi-classifier 400 is provided, the multi-classifier 400 can be configured to output results for the n classes as probability values, respectively.

A class described herein can mean a type of problem to be classified, a type of object to be classified, a type of state of existence to be classified, or a type of image to be classified.

For example, if a classification problem relates to an occurrence of an error, a class can mean a type of error (e.g., insufficient cooling power, water clogging, refrigerant leakage, etc., in the situation where an error occurs in a refrigerator).

The binary classifier can be configured to output a result for each class as True or False, Yes or No, or as a Zero or One.

In addition, the multi-classifier can be configured to output probabilities of classes (e.g., probabilities of the insufficient cooling power, water clogging, and refrigerant leakage) as results.

A decision regarding whether or not to execute the step of outputting the result for the input classification problem using the multi-classifier can be determined based on the result that is output from the at least one binary classifier. For example, if none of the binary classifiers produces a satisfactory result, then the multi-classifier can be used to classify the input.

Specifically, the step of outputting the result for the input classification problem using the multi-classifier may not be executed when the result output from the at least one binary classifier does not satisfy the preset condition (e.g., the multi-classifier can be skipped, if classification is adequately performed by one or more of the binary classifiers).

The preset condition can include a situation in which two or more results output from the at least one binary classifier are True, or a situation in which results output from the at least one binary classifier are all False.

That is, the classification method according to the one embodiment can be configured to operate the multi-classifier only when two or more binary classifiers output results as True or all the binary classifiers output results as False after acquiring results from all the binary classifiers, instead of sequentially applying the binary classifiers.

In addition, in the present disclosure, the combination of the binary classifier and the multi-classifier can generate 2ˆk combinations if there are k classes (the multi-classifier is included as a default) (where k is a natural number).

The present disclosure can determine a multi-classification problem by decomposing into binary classification problems, and can also use a multi-classifier (multi-classification model) in ensemble in order to overcome the limitations of determination only using the binary classification problem. For example, the strengths provided by using a multi-classifier can used to augment a weakness of the binary classifiers.

Figure 2:
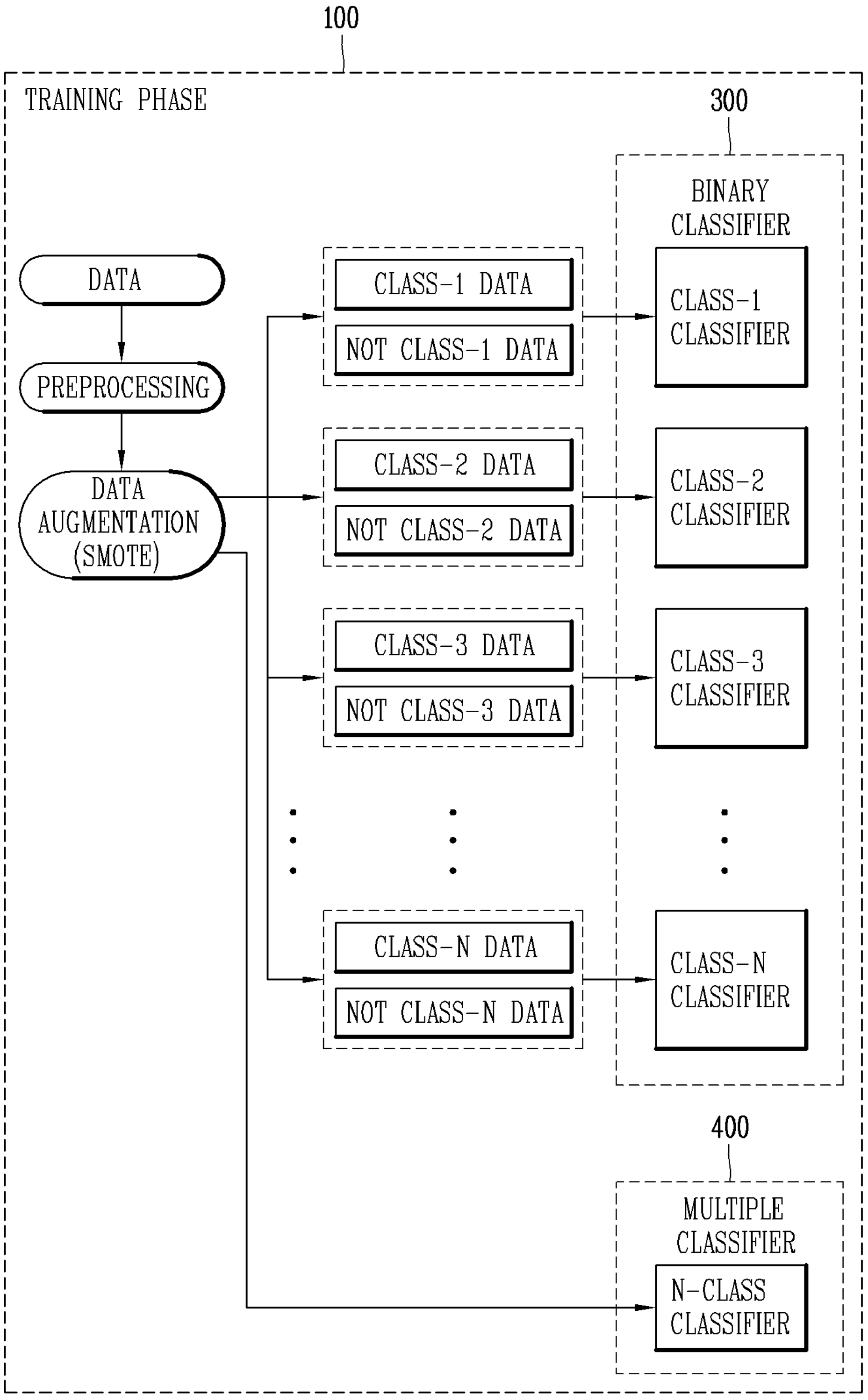
FIGS. 2, 3, 4, and 5 are conceptual views for explaining the classification method described in FIG. 1 in a divided manner or based the different parts of the classification method, according to embodiments of the present disclosure.

Referring to FIG. 2, in the present disclosure, two types of classifiers can be generated, one classifier can be the binary classifier 300 and the other classifier can be the multi-classifier 400.

For example, the binary classifier 300 can be generated in large numbers, e.g., as many as the number of classes of problems to be classified, and the single multi-classifier 400 can be generated. Alternatively, a plurality of multi-classifiers can be used.

Referring to FIG. 2, the classification method according to an embodiment of the present disclosure can further include, before the step of outputting the result for the input classification problem using the at least one binary classifier, receiving input data (Data), preprocessing the input data (Preprocessing) to generate preprocessed data, and replicating (augmenting) the preprocessed data (Data Augmentation). For example, the data can be replicated and each of the binary classifiers can receive and classify a same data set in parallel, but embodiments are not limited thereto. Alternatively, a data sample can be fed through the binary classifiers in a sequential order.

Thereafter, the classification method according to the present disclosure can further include classifying data for each class to solve a classification problem, and performing machine learning (or training) of the binary classifier for each class by using the classified data.

The classification method can further include performing machine learning of the multi-classifier using the replicated data.

Referring to FIG. 2, the processor of the present disclosure, in a training phase 100, can preprocess the input data (Preprocessing), and replicate (copy, augment) the preprocessed data to perform machine learning (or training) of the binary classifier and the multi-classifier (Data augmentation).

Thereafter, data classification can be carried out to perform supervised learning using the replicated data.

For example, supervised learning refers to an approach of training an artificial neural network in a state where labels for training data have been provided, and labels can mean correct answers (or result values) that the artificial neural network infers when the training data is input to the artificial neural network.

Unsupervised learning can refer to an approach of training an artificial neural network in a state where labels for training data are not previously known or have not been provided. Reinforcement learning can refer to a learning method in which an agent defined in an environment is trained to select an action or sequence of actions in order to maximize the cumulative reward in each state.

Machine learning that uses deep neural networks (DNN) each including multiple hidden layers, among artificial neural networks, is also called deep learning, and deep learning is a part of machine learning. Hereinafter, machine learning is used in a sense including deep learning.

In the classification method of the present disclosure, supervised learning can be performed to train binary classifiers.

For example, there are four types A, B, C, and D of preprocessed and replicated data. And, it is assumed that data corresponding to Class 1 is A, data corresponding to Class 2 is B, data corresponding to Class 3 is C, and data corresponding to Class 4 is D.

In this situation, the classification device of the present disclosure can classify Class-1 data as A, and Not-Class-1 data as B, C, and D (e.g., equal to A or equal to non-A), in order to perform supervised learning for the binary classifier for Class 1, and perform the supervised learning by inputting such classified data to the binary classifier for Class 1.

In addition, the classification device can classify Class-2 data as B and not-Class-2 data as A, C, and D (e.g., equal to B or non-B), in order to perform supervised learning for the binary classifier for Class 2, and perform the supervised learning by inputting the classified data to the binary classifier for Class 2.

The classification device can also classify Class-3 data as C and not-Class-3 data as A, B, and D (e.g., C or non-C), in order to perform supervised learning for the binary classifier for Class 3, and perform the supervised learning by inputting the classified data to the binary classifier for Class 3.

In this way, the supervised learning can be performed for each of k binary classifiers.

Figure 3:
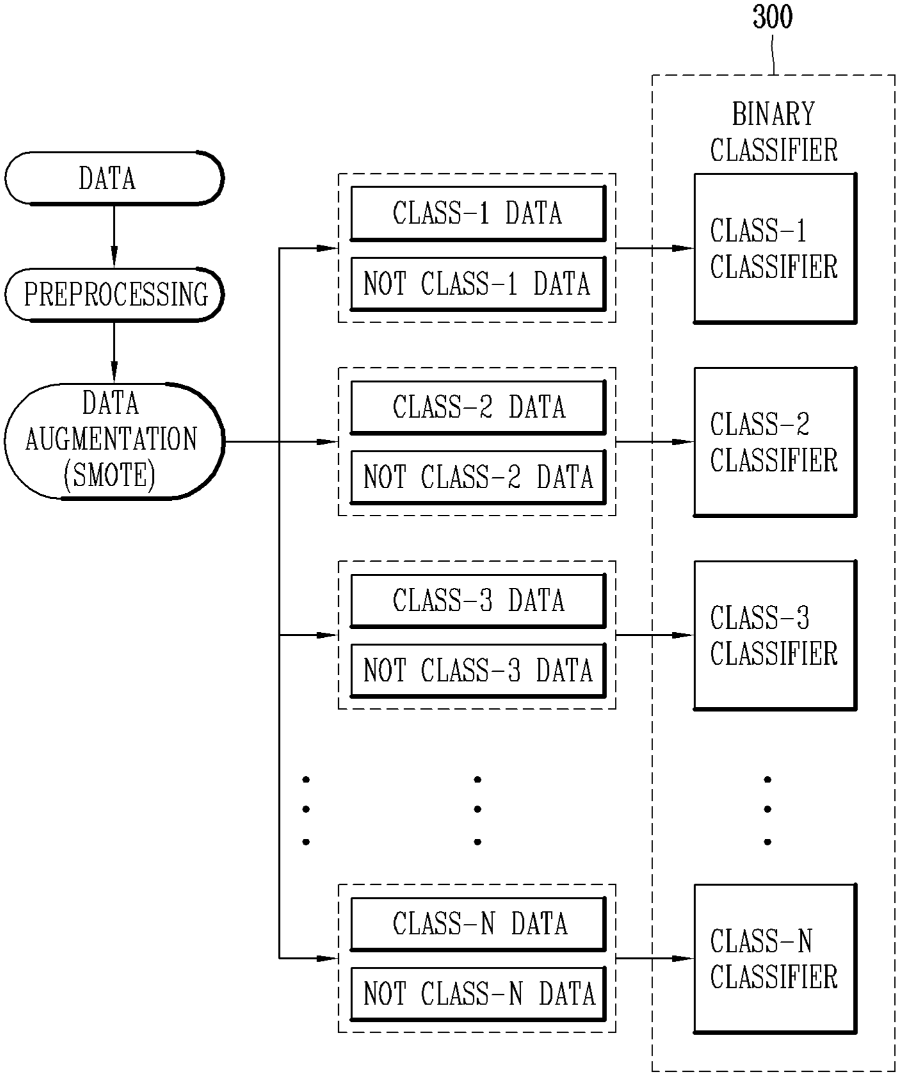

Also, referring to FIG. 3, as described above, if there is a classification problem for N classes (wherein N is a natural number), it can be divided into N binary classification problems.

For example, if there is a classification problem that has to classify four classes Class-1, Class-2, Class-3, and Class-4, a general multi-classifier is applied as one model to classify the four classes according to probabilities.

However, in the present disclosure, the four classes can be created as four binary classification models (binary classifiers) for whether a given data sample is "Class-1 or not," "Class-2 or not," Class-3 or not," and "Class-4 or not."

The present disclosure can have the following advantages by creating N binary classifiers (binary models) rather than using one multi-classifier model.

i) Sacrifice Avoidance of Specific Class.

In the process of training a single multiple classifier model, the model can be made in a direction to minimize the loss for determination of all classes.

If a goal is to increase overall performance, accuracy for each class may be lower than that when individual classes are classified with binary models. That is, the classification performance for some classes may be slightly lowered for the overall performance.

Therefore, the classification accuracy for each class is increased by classifying given data into data for the corresponding class and data not for the class to create binary models.

ii) Precision/Recall Optimization.

Precision/recall becomes an important factor in most classification applications. For example, in the situation of a diagnosis kit for Covid-19, it should be evolved to increase recall because the ratio that a person who is actually tested positive should be judged as positive for the virus has to increase.

Conversely, a search engine having higher precision is better because it is important that the number of objects to be searched is as many as possible. However, in the situation of multi-classification, there is no way to apply the precision/recall.

Therefore, classification is made based on the same criteria of one model for all classes, and it inevitably brings about sacrifice of the classification performance for a specific class depending on an application. An idea proposed is to apply a threshold to each binary model by changing each class into a binary form, and thus to achieve optimization according to characteristic of an application to which the model is to be applied, according to an embodiment of the present disclosure. For example, each of the different binary classifiers can have is own unique individual threshold.

Meanwhile, in the classification method according to another embodiment of the present disclosure, results can vary depending on an execution order of binary classifiers. For example, the binary classifiers can operate on a same data sample in parallel or the binary classifiers can operate in a specific order or in a sequential order.

Specifically, the at least one binary classifier is plural, and the plurality of binary classifiers can perform classification on different classes. Also, the classes can be related to each other or independent.

In this situation, in the step of outputting the result for the input classification problem using the at least one binary classifier that uses the binary classification, the number of plural binary classifiers that perform the classification problem can vary depending on an execution order of the plural binary classifiers.

Specifically, in the step of outputting the result for the input classification problem using the at least one binary classifier that uses the binary classification, a first number of binary classifiers can be executed when the plurality of binary classifiers are executed in a first order, and a second number of binary classifiers that is different from the first number can be executed when the plurality of binary classifiers are executed in a second order that is different from the first order.

For example, assuming that there are BinaryModel-1, BinaryModel-2, and BinaryModel-3, they can be determined in an order of BinaryModel-1, BinaryModel-2, and BinaryModel-3 (first order), and can also be determined in an order of BinaryModel-2, BinaryModel-1, and BinaryModel-3 (second order).

At this time, when a True value is obtained from BinaryModel-2 in the first order, the number of binary classifiers executed in the first order can be two.

Also, when a True value is obtained from BinaryModel-2 in the second order, the number of binary classifiers executed in the second order can be one.

That is, since whether a given sample corresponds to a corresponding class or not is determined in each model, when the models are executed in order, when a model (binary classifier) executed first determines that the given sample corresponds to the class, the other models in the following order may be terminated or skipped without being executed.

In other words, there is an effect on the order in which the models are executed. It can also be helpful for the performance optimization, according to an application to which a model is to be applied, to enable the decision of the order for determining each class.

Figure 4:
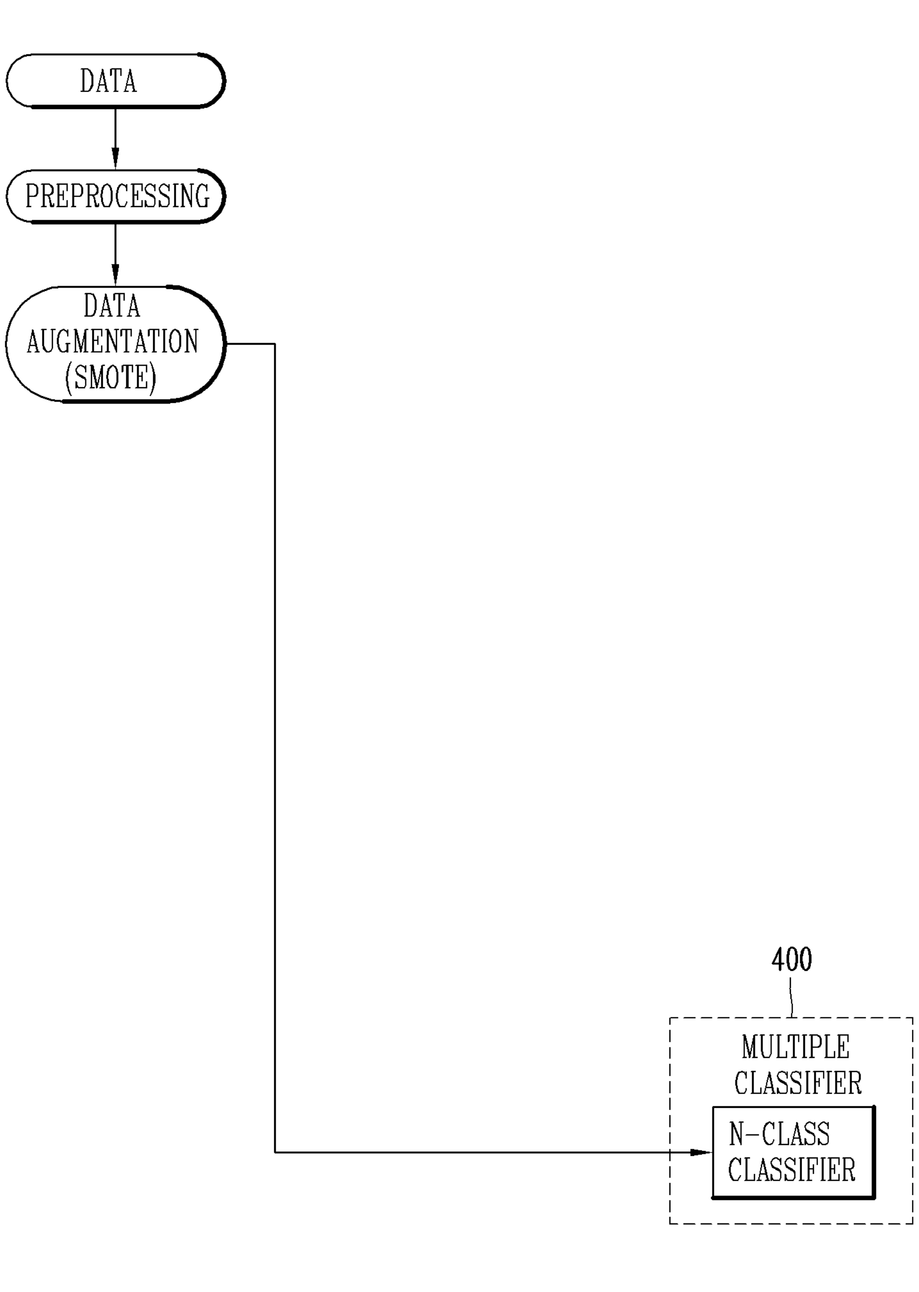

Referring to FIG. 4, even after the at least one binary classifier (binary models) have all finished execution, classification for a given sample (input classification problem) may not be completed.

For example, if a preset condition is satisfied (e.g., when two or more binary classifiers output True or all binary classifiers output False), the classification for an input classification problem may not be completed. In addition, although it may vary depending on a type of data, in some situations, a sample having a ratio of 10% or more may not be discriminated by binary models.

This may have a significant impact on the overall performance of the models. Therefore, in order to compensate for this potential weakness, the multi-classifier 400 can be applied to a sample that has not been adequately classified by the at least one binary classifier (binary models).

Multi-classification can use existing multi-classification, such as ResNet and VggNet.

Hereinafter, a prediction phase 200 will be described with reference to FIG. 5.

As described above, in the classification method of the present disclosure, the number binary classifiers (binary models) 300 that are created can be as many as the number of classes, and one multi-classifier (multi-classification model) 400 can be created and applied to all of the classes.

In the process of creating each classifier (each model), like a training phase on the left in the figure, a process of training N binary models (binary classifiers) and one multi-classification model (multi-classifier) after preprocessing the data can be performed.

In this situation, the classification device can adjust an individual threshold of each binary classifier to adjust the precision/recall to be suitable for requirements of an application to be realized.

Figure 5:
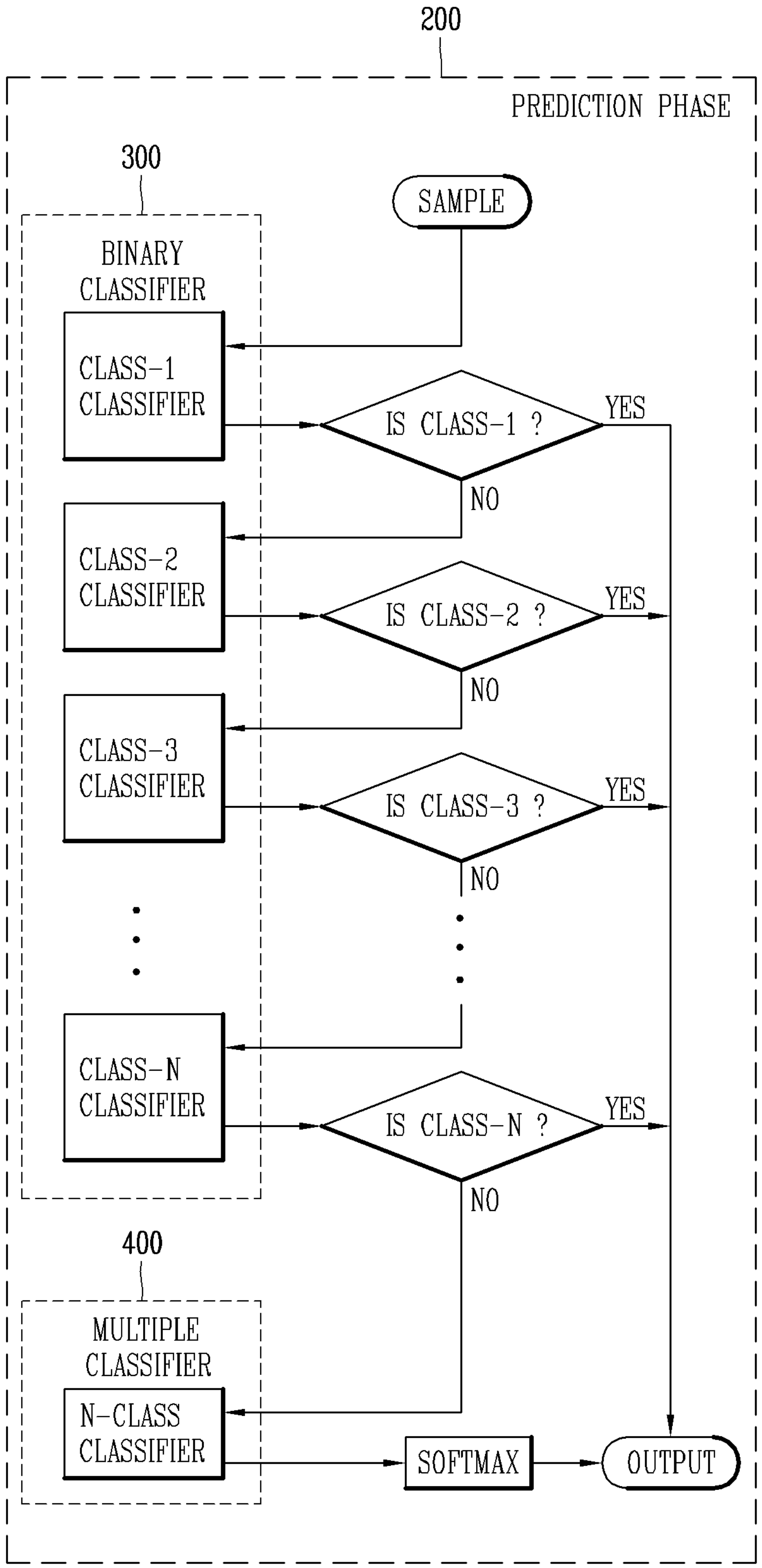

Afterwards, in the situation where the number of classes is N, the number of models (classifiers) is N+1, and there is a validation dataset, when a data sample to be classified is input, as illustrated in FIG. 5, a processor of the classification device sequentially executes the binary classifiers 300 of a total of N+1 models (classifiers).

While executing the binary classifiers 300 in order, the processor outputs a result value of a binary classifier that is the first one to output True.

If none of the binary classifiers output True when execution has completed or when two or more binary classifiers output True, the processor can then move on and execute the multi-classifier on the input data, apply a softmax function to the result of the multi-classifier, and output a class with the highest probability value.

In addition, the processor can find an order with the highest accuracy in an application to be realized by changing the execution order of the binary classifiers.

The present disclosure can classify actual data (or test data) using classifiers that are created through these processes.

When comparing performance of an ensemble of a single multi-classification model and binary classification models with blood cell classification data, which is representative data of the multi-classification, it can be confirmed that the classification method according to the present disclosure has achieved performance improvement even when using the same data and the same type of models.

In addition, in the situation of an issue candidate group extraction model provided by Intellytics, it can be confirmed that the performance is improved from 61% to 97% based on the recall when the method proposed according to an embodiment in the present disclosure is used.

Figure 6:
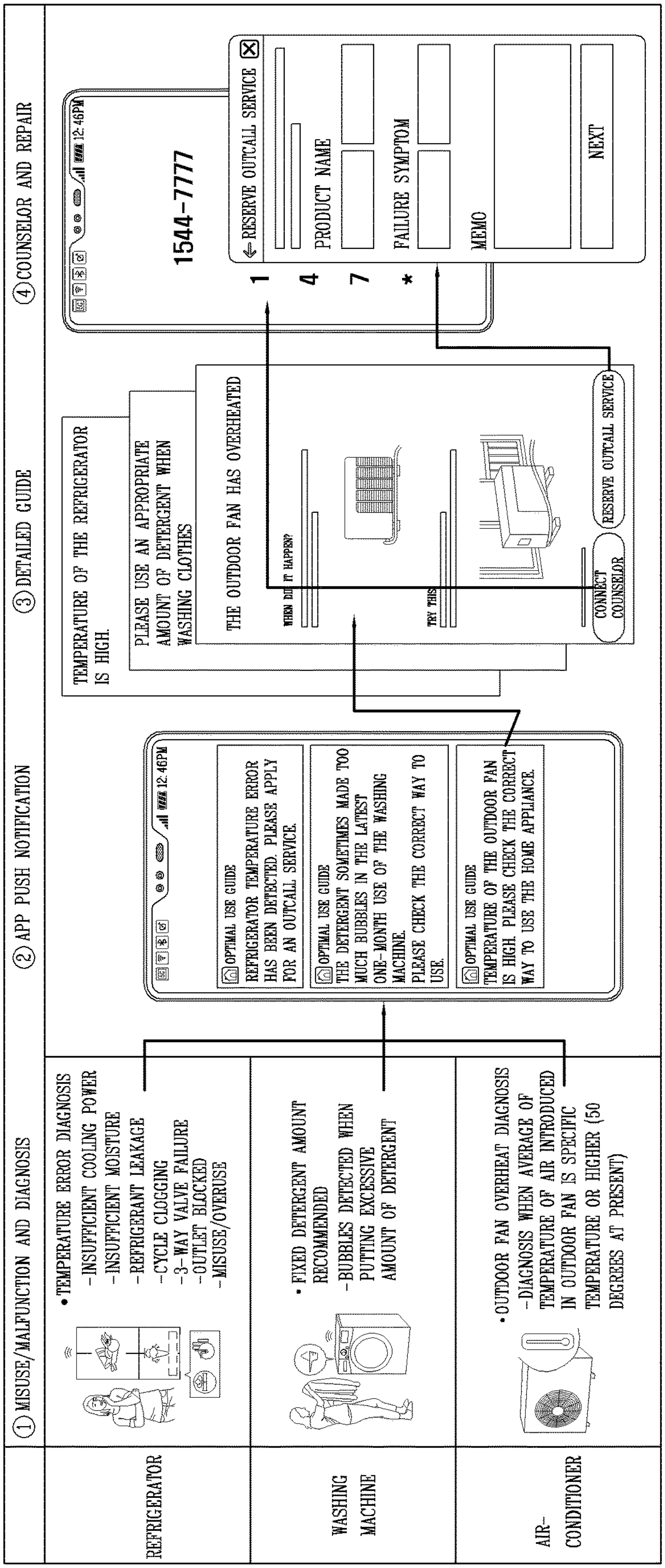
FIG. 6 is a conceptual view illustrating an embodiment in which a classification method according to an embodiment of the present disclosure is applied.

FIG. 6 is a conceptual view illustrating an embodiment in which a classification method according to an embodiment of the present disclosure is applied.

The classification device and classification method of the present disclosure can be applied to various fields, and for example, as illustrated in FIG. 6, can be used for misuse/malfunction and diagnosis of home appliances.

For example, as illustrated in FIG. 6, when a problem occurs in a refrigerator (when a temperature error (defect, failure, fault) is diagnosed), the classification method according to the present disclosure can be applied to determine a cause (class) of the problem.

For example, in order to identify the cause (class) of a temperature error diagnosis problem, in the classification method of the present disclosure, binary classifiers can be created for as many as n classes (n causes), such as insufficient cooling power, water clogging, refrigerant leakage, etc., and then one multi-classifier can further be created.

Then, the processor can sequentially classify the causes (classes) of the temperature error diagnosis problem through the binary classifiers, and decide the cause (class) of the problem using the multi-classifier when True is output with respect to a plurality of causes (classes), e.g., more than two, in the binary classifiers or when False is output from all the binary classifiers.

Thereafter, the processor can control a user's mobile terminal to output an App push notification corresponding to the decided class and a detailed guide corresponding to the App push notification.

The detailed guide can include a button or link that connects to a counselor connection page or a button that outputs an outcall service reservation page.

FIG. 7 is a view illustrating confirmation of an advantage of using a classification method according to an embodiment of the present disclosure.

As illustrated in FIG. 7, in the situation of a deep learning framework model such as Pytorch, a structure of models as illustrated in FIG. 7 can be confirmed.

At this time, a binary model (binary classifier) can be identified by out_features=2 (710) of a last layer.

Such a binary model, as illustrated in FIG. 7, can include a code of out_features=2 (710), and can be included in one or more (or a plurality of) deep learning framework models.

For example, as illustrated in FIG. 7, at least one binary model (or a plurality of binary models) 700*a*, . . . , 700*n* can be included in the deep learning framework models, and one or more multi-classifier codes 720 can be included.

That is, it can be included in the scope of the present disclosure when there are two or more classification methods (or classification models) 700*a* to 700*n* (where n is a natural number) for solving a classification problem, and at least one binary classifier (binary model) and at least one multi-classifier (multi-classification model) 720 are included.

The present disclosure can be implemented as computer-readable codes in a non-transitory, computer-readable medium. The computer-readable medium can include all types of recording devices each storing data readable by a computer system. Examples of such computer-readable media can include hard disk drive (HDD), solid state disk (SSD), silicon disk drive (SDD), ROM, RAM, CD-ROM, magnetic tape, floppy disk, optical data storage element and the like. Also, the computer-readable medium can also be implemented as a format of carrier wave (e.g., transmission via an Internet). The computer can include the processor of the classification device. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A method for performing classification, the method comprising:

inputting data to a plurality of binary classifiers configured to perform binary classification to generate a binary classification result;

determining whether the binary classification result satisfies a preset condition, the preset condition including a case where at least two of the plurality of binary classifiers output True or a positive result, or a case where all of the plurality of binary classifiers output False or a negative result;

in response to the binary classification result satisfying the preset condition, executing a multi-classifier configured to perform multi-classification, inputting the data to the multi-classifier for generating a multi-classification result, and outputting a final classification result based on the multi-classification result; and in response to the binary classification result not satisfying the preset condition, not executing the multi-classifier and outputting a final classification result based on a classification result of a binary classifier, among the plurality of binary classifiers, that has output True or a positive result.

2. The method of claim 1, wherein a number of the plurality of binary classifiers corresponds to a number of classes to be classified for the data.

3. The method of claim 2, wherein the number of classes to be classified is n, the number of the plurality of binary classifiers is n, and a number of the multi-classifier is at least one, and wherein n is a natural number.

4. The method of claim 1, further comprising:

determining whether to perform the multi-classification on the data with the multi-classifier based on the binary classification result output from the plurality of binary classifiers.

5. The method of claim 1, wherein the plurality of binary classifiers perform binary classification on different classes.

6. The method of claim 5, further comprising:

varying a number of binary classifiers among the plurality of binary classifiers that perform binary classification on the data based on an execution order of the plurality of binary classifiers; and in response to the binary classification result satisfying the preset condition, terminating remaining binary classifiers without performing further classification.

7. The method of claim 6, further comprising:

executing a first number of binary classifiers among the plurality of binary classifiers to perform binary classification on the data when the plurality of binary classifiers are executed in a first order; and executing a second number of binary classifiers among the plurality of binary classifiers to perform binary classification on the data when the plurality of binary classifiers are executed in a second order different from the first order, the first number being different than the second number.

8. The method of claim 1, further comprising:

before outputting the binary classification result using the plurality of binary classifiers, preprocessing the data to generate preprocessed data and replicating the preprocessed data to generate replicated preprocessed data.

9. The method of claim 8, further comprising:

applying the replicated preprocessed data to each of the plurality of binary classifiers in parallel.

10. The method of claim 8, further comprising classifying the data for each class to solve a classification problem by using the replicated preprocessed data to generate classified data; and performing machine learning of the at least one binary classifier for each class using the classified data, wherein the machine learning of the plurality of binary classifiers includes adjusting a threshold or a condition of one or more of the plurality of binary classifiers.

11. The method of claim 8, further comprising performing machine learning of the multi-classifier using the replicated data, wherein the machine learning of the multi-classifier includes adjusting a probability or a condition of the multi-classifier.

12. The method of claim 1, wherein the plurality of binary classifiers and the multi-classifier are implemented in a processor or individual hardware components.

13. A method for controlling an artificial intelligence device to perform classification, the method comprising:

receiving data by a processor in the artificial intelligence device;

performing, by the processor, binary classification on the data based on plurality of binary classifiers to generate a binary classification result;

determining whether the binary classification result satisfies a preset condition, the preset condition including a case where at least two of the plurality of binary classifiers output True or a positive result, or a case where all of the plurality of binary classifiers output False or a negative result;

in response to the binary classification result satisfying the preset condition, executing, by the processor, a multi-classifier to to perform multi-classification, inputting the data to the multi-classifier for generating a multi-classification result and outputting a final classification result based on the multi-classification, result; and in response to the binary classification result not satisfying the preset condition, not executing the multi-classifier and outputting a final classification result based on a classification result of a binary classifier, among the plurality of binary classifiers, that has output True or a positive result.

14. A device, comprising:

a memory configured to store input data; and a processor configured to:

receive data, perform binary classification on the data based on a plurality of binary classifiers to generate a binary classification result, determine whether the binary classification result satisfies a preset condition, the preset condition including a case where at least two of the plurality of binary classifiers output True or a positive result, or a case where all of the plurality of binary classifiers output False or a negative result, in response to the binary classification result satisfying the preset condition, execute a multi-classifier to perform multi-classification, input the data to the multi-classifier for generating a multi-classification result, and output a final classification result based on the multi-classification result, and in response to the binary classification result not satisfying the preset condition, not execute the multi-classifier and output a final classification result based on a classification result of a binary classifier, among the plurality of binary classifiers, that has output True or a positive result.

* * * * *